Patented June 27, 1939

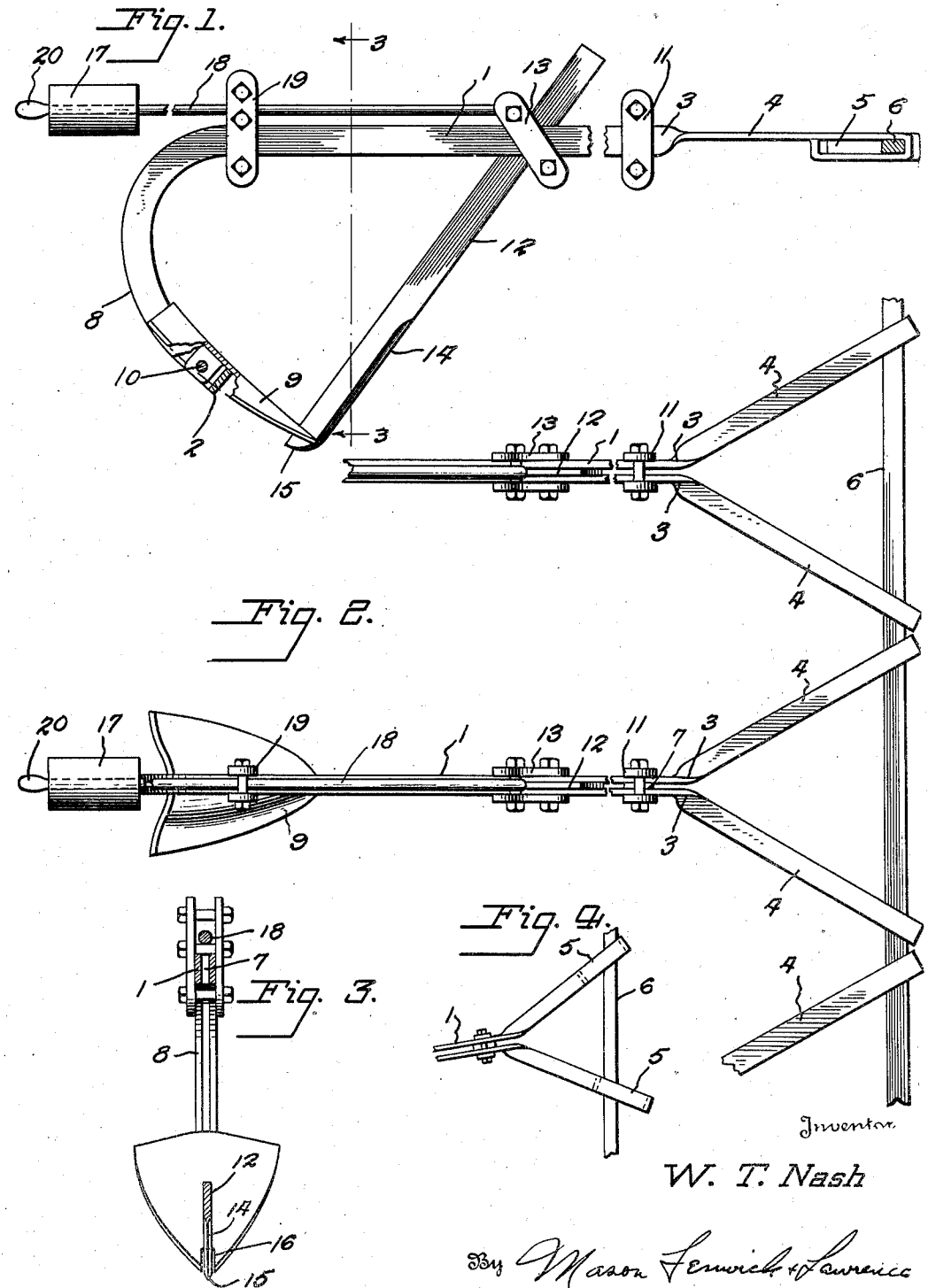

2,164,220

UNITED STATES PATENT OFFICE 2,164,220

PLOW

William T. Nash, Appomattox, Va.

Application May 10, 1937, Serial No. 141,871

1 Claim. (Cl. 97—182)

This invention relates to an agricultural plow particularly designed for plowing "new ground", that is to say, land where plowing is obstructed by stumps and roots.

One of the objects of the present invention is the construction of a plow of that type which employs a sword in association with the plow point for cutting roots, riding the stumps, etc., in which the sword and plow point interlap in such manner that while the sword is retained against lateral deviation by the plow point, the latter may move back and forth through the inherent resiliency of itself and the plow beam, independently of the sword, avoiding destructive shocks and improving the smoothness of the operation of the plow.

Another object of the invention is to provide the plow point as a back stop for the sword, preventing it from becoming bent or misaligned.

Still another object of the invention is to provide a plow of the type described with draw bar connections enabling it to swing laterally in either direction when turned by engagement with a stump.

Other objects of the invention relate to the integral construction of the plow beam and other features as will hereinafter appear.

In the drawing which accompanies and forms a part of the following specification and throughout the several figures of which the same characters of reference have been employed to designate identical parts:

Figure 1 is a side elevation of a plow embodying the features of the present invention;

Figure 2 is a plan view showing a draw bar with a gang of plows constructed according to the principles of the invention, parts being broken away or omitted;

Figure 3 is a vertical section taken along the line 3—3 of Figure 1; and

Figure 4 is a plan view of the anterior ends of the plow beam illustrating its action with respect to the draw bar when laterally diverted.

Referring now in detail to the several figures, the numeral 1 represents a plow beam. This is preferably made from an integral strip of metal doubled upon itself in the middle as at the point 2, both sides being brought back in parallel relation to the point 3 where they are twisted through an angle of 90°, the forward portions 4 being bent around to form the elongated slots or loops 5 adapted to embrace the draw bar 6.

The two sides of the beam are preferably spaced apart in parallel relation by washers 7 conveniently located around certain bolts. The rear portion 8 of the plow beam is curved downwardly and forwardly. A plow point 9 is suitably secured as by the bolt 10 to the lower end of the plow beam. For the purpose of the present invention, the plow point is shown as of the shovel type since this is believed best adapted to plowing new land. However the invention is not to be considered as restricted to a shovel plow.

Just rearwardly of the point 3 at which the sides of the plow beam are twisted, said sides are held rigidly in parallelism by suitable means such as the clamp 11. The twisted forward portions 4 are bent divergently as indicated in Figure 2 so that they engage the draw bar 6 at widely spaced points. Due to the fact that the loops or slots 5 are of considerably greater length than the thickness of the draw bar 6, there is considerable lost motion in the connection of the plow to the draw bar so that when the plow point is diverted by contact with a stump in either direction, either of the loops 5 may become a fulcrum about which the plow beam will swing through an angle limited only by the extent of the lost motion in the opposite loop. This is clearly indicated in Figure 4.

A sword 12 extends between the sides of the plow beam at some point back of the point of divergency of the forward portions 4 and may be adjustably secured by means such as the clamp 13 at any point throughout the intermediate portion of the plow beam so that it may be set to any angle of inclination with respect to the plow point. The sword is preferably a flat steel bar with the lower portion tempered and brought to a knife edge 14 at the front. The sword preferably extends an inch or so below the plow point as indicated at 15 in Figure 1.

The plow point is formed with a recess or slot 16 in its forward end in which recess the end portion of the sword is freely seated. It is apparent that while ordinarily a sword being supported solely at its upper end may be readily bent or laterally deviated by contact with major obstructions in the soil, it cannot be laterally bent in the present invention since it is embraced between the sides of the slot 16. It will be observed that the straight intermediate part of the plow beam together with the curved portion thereof including the plow point, and the sword, form a substantially triangular frame which if the end of the sword were secured to the plow point would have truss-like rigidity so that it would meet major obstructions with a shock which would interfere with the smooth operation of the plow as well as be destructive to the plow in a short while. By having a free engagement between the plow point and the end of the sword, the plow point is permitted to recede with respect to the sword when excessively loaded, through the inherent resiliency of the parts, thus yielding a little, avoiding destructive shocks and improving the smooth running of the implement. The plow point also normally acts as a back stop for the sword, holding the lower end of it in fixed position of adjustment.

Since this plow is designed to be drawn by a tractor, and does not have to be held to the furrow manually, it is desirable to have an adjustable weight at the rear to hold it properly to the ground. This weight 17 is slidable along a rod 18 which is suitably secured in a substantially horizontal direction as by the clamps 13 and 19. The single handle 20 on the end of the rod is for purpose of lifting the plow point from the ground in the event that it should become caught under a root.

In operation, as the plow moves forward the sword 12 cuts the roots which it encounters with a shearing cut. The more nearly vertical the sword is set, the deeper the implement will plow, but on the other hand the heavier the root growth, it will be necessary to adjust the sword to a more inclined position. If the sword strikes a stump a little off center of the stump, the entire plow beam will swing to one side or the other due to the elongated draw bar connections provided by the slots 5 in the divergent portions 4 of the plow beam. When the plow strikes a stump squarely in the middle, the sword will ride over it and since the sword projects a slight distance below the plow point, there is no risk of the plow point being caught on the stump.

While I have in the above description disclosed what I believe to be a preferred and practical embodiment of the invention, it will be understood to those skilled in the art that the specific details of construction and arrangement of parts is merely by way of illustration and not to be construed as limiting the scope of the invention as defined in the appended claim.

What I claim is:

Plow comprising a beam formed integrally from a flat steel bar bent upon itself in the middle, the two sides thus formed being suitably spaced in parallel relation from the middle to a point adjacent their ends, said plow beam adjacent the middle being curved downwardly and forwardly and forming a resilient support for a plow point, the said plow beam in front of the downwardly curved portion being substantially horizontal, the sides of said plow beam at a point adjacent their free ends being twisted substantially at right angles and divergently spread at an acute angle, the ends of said divergent portions being bent back to form elongated loops, a plow point secured to said plow beam at the lower end of the curved portion, a sword having its upper end extending between the sides of the plow beam and adjustably clamped thereto along the intermediate part of said plow beam, said plow point having a recess freely embracing the lower end of said sword.

WILLIAM T. NASH.